United States Patent

Rudowicz

Patent Number: 6,006,067
Date of Patent: Dec. 21, 1999

[54] METHOD FOR A SELECTIVE CALL RECEIVER TO DETERMINE ITS POSITION AND TO DISREGARD CERTAIN SIGNALS FROM A SATELLITE

[75] Inventor: Michael James Rudowicz, Lake Worth, Fla.

[73] Assignee: Motorola, Schaumburg, Ill.

[21] Appl. No.: 08/842,103

[22] Filed: Apr. 28, 1997

[51] Int. Cl.[6] .................................................. H04B 7/185
[52] U.S. Cl. ...................... 455/13.4; 455/456; 455/440; 455/427
[58] Field of Search .................................... 455/38.3, 427, 455/440, 12.1, 456, 226.2, 13.4

[56] References Cited

U.S. PATENT DOCUMENTS

| | | |
|---|---|---|
| 4,860,003 | 8/1989 | DeLuca et al. ..................... 340/825.44 |
| 5,008,952 | 4/1991 | Davis et al. . |
| 5,010,317 | 4/1991 | Schwendeman et al. . |
| 5,121,503 | 6/1992 | Davis ....................................... 455/12.1 |
| 5,382,949 | 1/1995 | Mock et al. ......................... 340/825.44 |
| 5,530,918 | 6/1996 | Jasinski .................................... 455/56.1 |
| 5,640,166 | 6/1997 | Siwiak .................................... 342/354 |
| 5,721,534 | 2/1998 | Olds et al. .......................... 340/825.44 |

*Primary Examiner*—Wellington Chin
*Assistant Examiner*—Sheila B. Smith
*Attorney, Agent, or Firm*—Pablo Meles

[57] ABSTRACT

A selective call receiver that receives signals transmitted by orbiting satellites uses certain information transmitted by the satellites to calculate an estimate of its position. Using that estimate and other information, the selective call receiver is able to save power by disregarding certain information contained in transmitted signals that are not intended for it.

7 Claims, 4 Drawing Sheets

METHOD FOR A SELECTIVE CALL RECEIVER TO DETERMINE ITS POSITION AND TO DISREGARD CERTAIN SIGNALS FROM A SATELLITE

FIELD OF THE INVENTION

This invention is directed generally to Selective Call Receivers (SCR's) capable of receiving signals transmitted from orbiting satellites.

BACKGROUND OF THE INVENTION

A satellite communication system uses satellites in low earth orbit to transmit messages and other signals to SCR's located on or near the surface of the earth. Each satellite can transmit multiple beams of RF (Radio Frequency) energy, with each beam being directed to a different geographic area. Each beam carries scheduling information that tells receiving SCR's when and where to start decoding frames which may contain messages for them.

An SCR generally receives and decodes signals from several beams, some of which may be intended for geographic areas outside the SCR's service area and which contain no messages for that particular SCR. Nevertheless, the SCR will decode the scheduling information contained in all received beams even though one or more of the received beams does not contain scheduling information intended for that SCR. As a result of decoding scheduling information intended for other SCR's, the SCR is erroneously directed to look for messages that are intended for others, thus wasting the SCR's battery life. Battery life could be improved if an SCR could disregard scheduling information transmitted by beams which are intended to serve geographic areas relatively remote from the its position.

DESCRIPTION OF THE PREFERRED EMBODIMENT

A satellite communication system is described in U.S. Pat. No. 5,613,194 entitled "Satellite Based Cellular Messaging System and Method of Operation Thereof", the teachings of which are incorporated herein by reference. It is assumed that the SCR's discussed herein are operating within that type of satellite communication system and using the signaling protocol described therein, although other signaling protocols could be used.

In such a satellite communication system, the surface of the earth is divided into Logical Delivery Areas, referred to herein as LDA's. There are 26,631 sequentially numbered LDA's, each with a diameter of about 150 km (kilometers). At any given point in time, an SCR will be in one such LDA, and it can roam from one LDA to another. With this invention, an SCR is able to determine which LDA it is in; i. e., its current position.

In the satellite communication system, the surface of the earth is encircled by 155 imaginary lines called Rows, analogous to latitudes. The location of each LDA can be identified by the Row it occupies and its position in the Row. For example, LDA No. 13, 449 is located at Row 78, Position 266.

Figure 1:
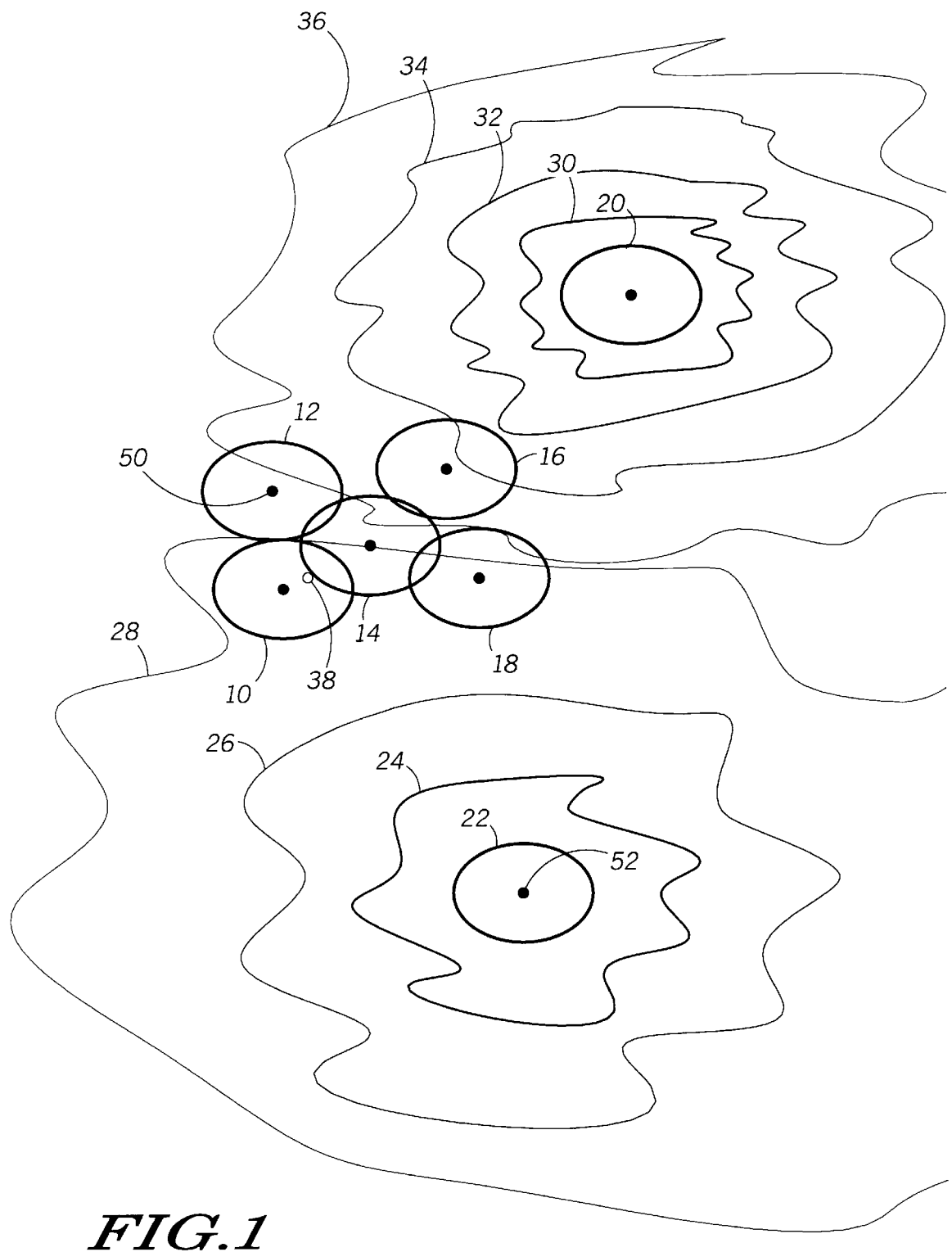
FIG. 1 illustrates a pattern of beams impinging on the earth, the beams having been transmitted from an orbiting satellite.

Referring to FIG. 1, beams 10–22 are shown as impinging on the earth. The shape of each beam is shown as elliptical, but it should be understood that there is no fixed boundary to a beam. The elliptical beam patterns identify the areas where the beams are intended to impinge and where much of their energy is located. However, their energy spreads beyond the elliptical boundaries in the manner shown for beams 20 and 22. Beam 22, for example, spreads its energy over a relatively wide area as indicated by signal strength contours 24, 26 and 28. Similarly, beam 20 spreads its energy over a wide area as indicated by signal strength patterns 30, 32, 34 and 36.

Each beam covers a service area that encompasses approximately 96 LDA's, an area that is equivalent to approximately 14,400 square km. One LDA 38 is shown as being within the boundary of beam 10. A SCR located in LDA 38 will receive signals from beams 10, 12, 14, 16 and 18. These beams carry information intended for SCR's located in the service area where these beams impinge. Beams 20 and 22 are located remotely from LDA 38 and they carry information intended for SCR's located in a service area where beams 20, 22 and other beams (not shown) impinge.

Some energy from beams 20 and 22 reaches LDA 38, and if that energy is at a sufficient level, an SCR located in LDA 38 will receive and decode signals carried by beams 20 and 22. The reason this can cause a problem is best explained by referring to FIG. 2 which shows the signaling protocol used in the satellite communication system.

The illustrated protocol has a framing structure with a four-level timing hierarchy. The highest level of this hierarchy is a 194.4 second (2160 frames) superframe 40. The superframe 40 comprises nine blocks 42 of 21.6 seconds (240 frames) each. Each block 42 comprises 5 groups 44 of 4.32 seconds (forty-eight frames). The first group of each block 42 is an Acquisition Group that contains scheduling information for SCR's known to be located within the area being served. That scheduling information tells those SCR's where to look for messages within four subsequent message groups. Finally, each group 44 comprises forty-eight 90 ms L-band frames 46. A simplex message time slot 48 occupies 20.48 ms of the 90 ms L-band frame 46.

Each SCR is active during one of the blocks 42. When an SCR becomes active, it synchronizes itself to the signaling protocol and decodes the Acquisition Group to determine which particular message group (within the same block) holds its message. All SCR's that are active during a particular block 42 attempt to decode the Acquisition Group in that block and, if so directed, to look for messages within the message groups within that block.

In transmitting blocks of information, each beam includes information intended for SCR's that are known to be located in an area served by the beam. (When an SCR roams, the user is expected to notify the system of his new location, and the system stores that information). For example, if a message is intended for an SCR known to be located in a service area that includes LDA 38, then a message for that SCR would be included in the frames transmitted by one or more of beams 10–18. Also, the frames that comprise the corresponding Acquisition Group would carry information directing that SCR to the appropriate message group to find its message.

While an SCR is located in LDA 38, other Acquisition Group frames are transmitted in beams 20 and 22 (and in other beams that are not shown). Because energy from these remote beams can extend to LDA 38, an SCR located there will receive and decode instructions in an Acquisition Group frame transmitted in beams 20 and 22. Consequently, the SCR will try to decode information (look for a message) in frames of the subsequent message groups transmitted by those beams. Of course, beams 20 and 22 do not carry a message for an SCR located in LDA 38. Thus, the SCR reduces its battery life by decoding data that is not intended for it.

An SCR that operates according to this invention determines its location and disregards scheduling information received from beams that are remote from its location. Thus, an SCR operating according to the invention at LDA 38 determines that it is located at LDA 38, decodes message information from nearby beams 10–18, and disregards signals from remote beams 20 and 22, thereby extending its battery life.

One piece of information that is used by an SCR to calculate its position is called a reference LDA, or reference delivery area. Each transmitted beam is directed toward a specific geographic area (which changes as the satellite moves with respect to the earth), and each beam carries information that identifies its reference LDA. A beam's reference LDA is an LDA which is intended to be closest to the center of the beam's projection onto the earth's surface. Thus, in FIG. 1 the reference LDA for beam 12 is LDA 50, and the reference LDA for beam 22 is LDA 52.

To determine its current position according to the invention, an SCR decodes signals received from multiple beams, including information identifying reference LDA's. In FIG. 1, for example, an SCR operating at LDA 38 decodes signals received from all beams 10–18, 20 and 22 and obtains the reference LDA of each beam.

The SCR also measures the signal strength of each of a plurality of the decoded signals, and stores this information in the SCR's memory. The SCR preferably measures the signal strength of all received beams. The number of signal strength measurements that are stored depends on the memory capacity and processing power of the SCR.

The information that the SCR decodes identifying the reference LDA's is also stored, at least for every beam whose signal strength was measured and stored. Thus, for each of a plurality of beams, there is a signal strength measurement and a corresponding stored reference LDA.

The SCR then calculates its current position using its last known (or estimated) position, the previously measured signal strengths, and the stored reference LDA's. The specific calculations used are discussed in more detail below. Knowing its current position, the SCR also disregards subsequent scheduling information contained in Acquisition Group frames transmitted by beams having reference LDA's that are at least a predetermined distance beyond the SCR's current position. For example, a SCR that has determined its current position can disregard signals received from beams whose reference LDA's are located beyond a radius of approximately 450 km from the SCR's current position.

Referring to FIG. 1, an SCR that has decoded signals from all the beams to determine their reference LDA's, and which has then determined that its current position is in LDA 38, will disregard signals that include message groups carried by remote beams 20 and 22. Consequently, the SCR's battery is conserved.

Figure 3:
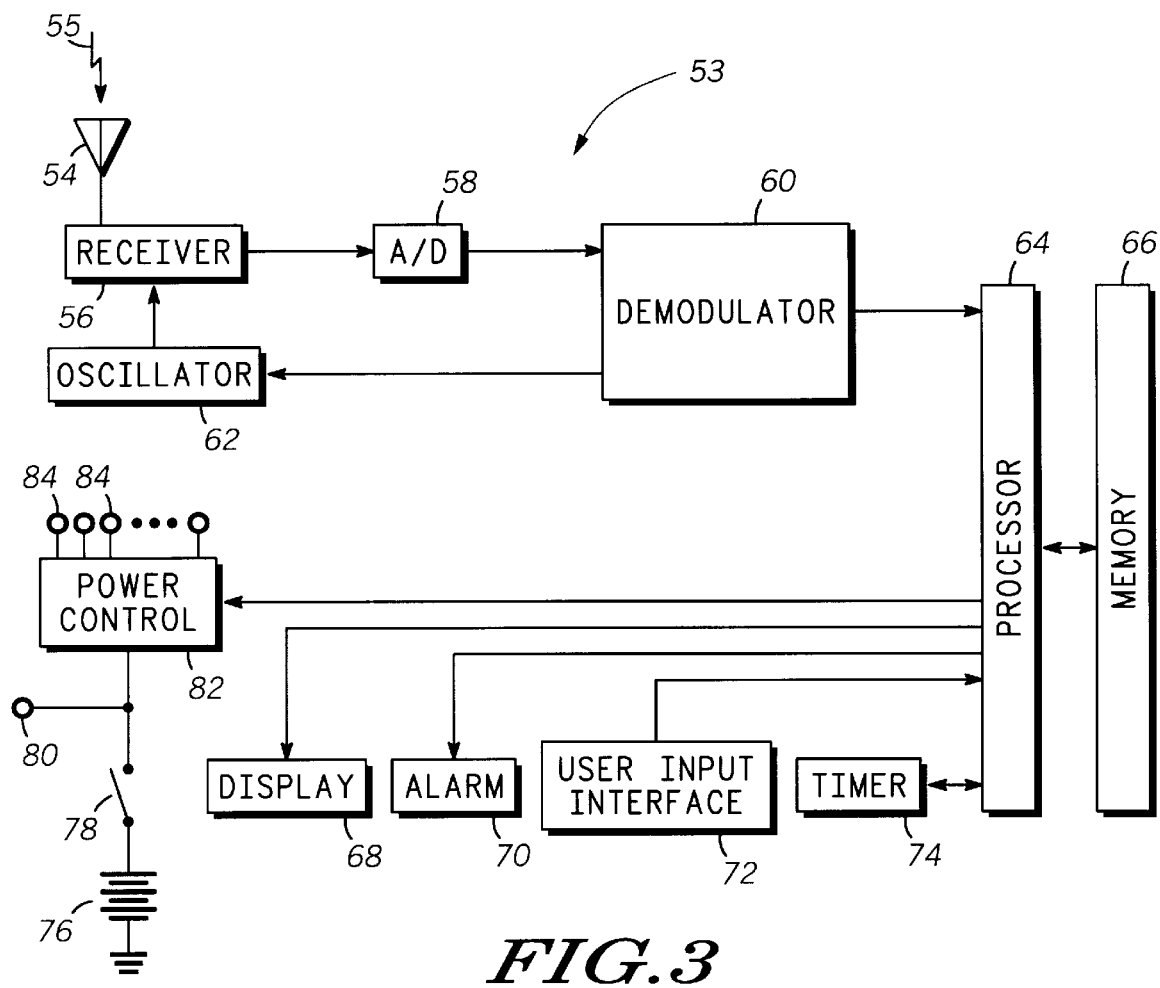
FIG. 3 is a block diagram of a SCR that operates in accordance with the invention.

A SCR that is able to calculate its position in accordance with the invention is shown in FIG. 3. The illustrated SCR 53 includes an antenna 54 through which a communication link 55 is established with satellite transmitters. Antenna 54 feeds a receiver 56 which includes RF (Radio-Frequency), mixing, and intermediate-frequency stages (not shown) as needed to convert RF signals to baseband. Receiver 56 couples to an analog-to-digital (A/D) converter 58 which digitizes the baseband signal, and A/D converter 58 couples to a digital demodulator 60 that extracts digital data from the digitized baseband signal.

The demodulator 60 recovers Quaternary phase shift keying encoded data included in the transmission from link 55. Demodulator 60 also supplies a feedback signal to control an oscillator 62. Oscillator 62 provides an oscillation signal that receiver 56 uses in converting the RF signal to baseband.

Demodulator 60 feeds its digital data output to a processor 64. Processor 64 couples to a memory 66 which permanently stores certain data, including computer programs that instruct SCR 53 to perform various procedures, including calculating its position.

The memory 66 also stores temporary data which changes as a result of operating the SCR. It is processor 64, under the control of programs stored in memory 66, that controls the operation of SCR 53.

Processor 64 couples to various peripheral devices, such as a display 68, an alarm 70, a user input interface 72, and a timer 74. Processor 64 controls display 68 to show data to a user of SCR 53. Processor 64 controls alarm 70 to audibly and/or visibly indicate the receipt of a message addressed to SCR 53. Processor 64 receives user input, preferably through the operation of keys or buttons (not shown) through interface 72. Processor 64 utilizes timer 74 to synchronize its operations with system timing and to keep track of the time of day.

SCR 53 is energized by a battery 76 which couples through a power switch 78 to a terminal 80 and to a power control section 82. Power control section 82 switches power to terminals 84 in accordance with commands received from processor 64. Terminal 80 supplies power to at least timer 74, while terminals 84 supply power to the remaining components of SCR 53.

SCR 53 is de-energized when switch 78 is open, and it is fully energized and operational when switch 78 is closed and when power is routed to all of terminals 84. SCR 53 may also operate in an energized but low power sleep mode when power is not routed to one or more of terminals 84, but switch 78 is closed to route power through terminal 80 to at least timer 74.

Further description of the SCR 53 is available in the above-referenced Patent. For purposes of this invention, it suffices to add that the processor 64 causes the SCR 53 to operate in accordance with the invention by virtue of a computer program that is stored in the memory 66. The operation of that computer program will now be described.

Figure 2:
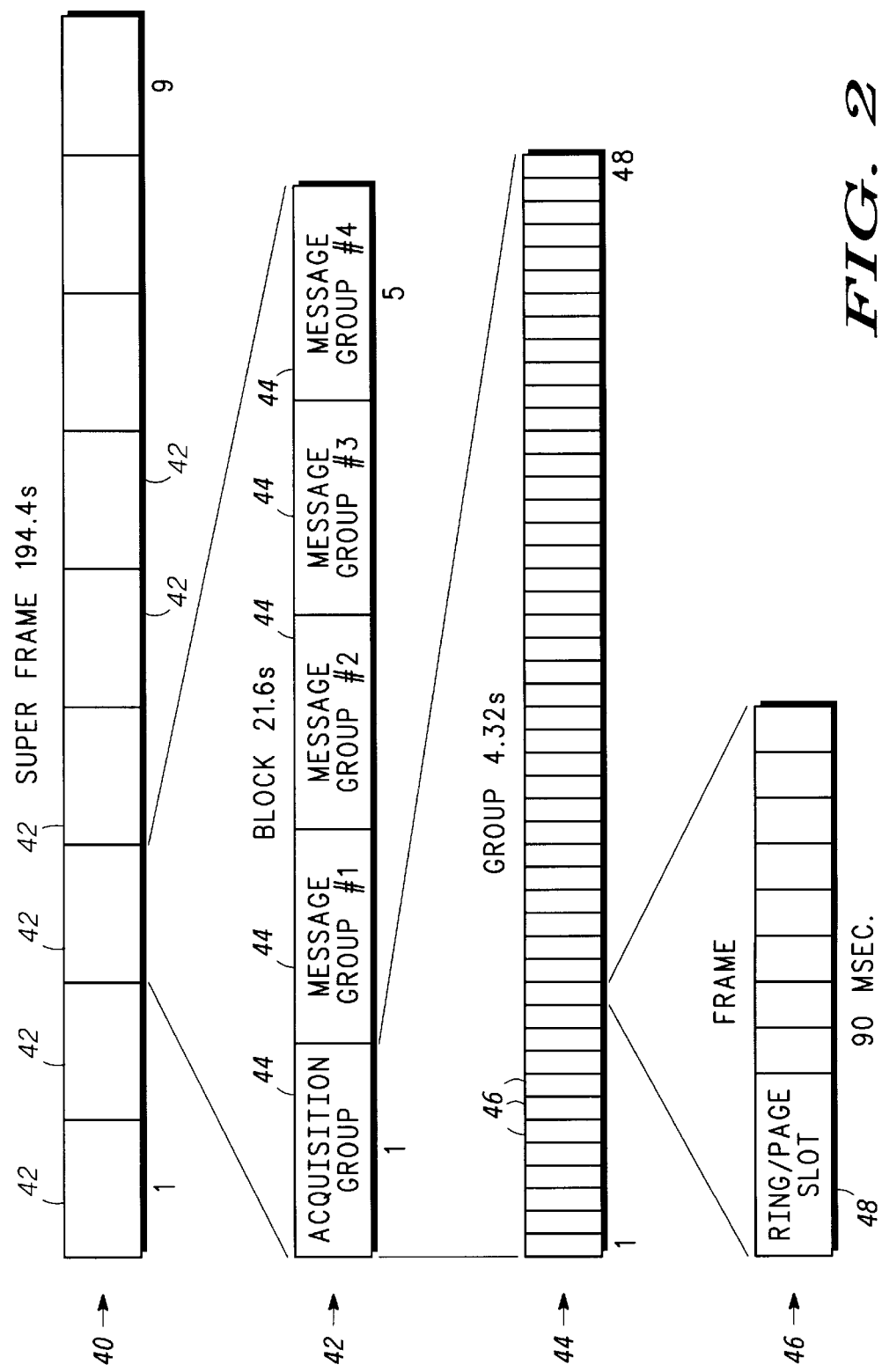
FIG. 2 is a diagram illustrating a signaling protocol that is used in the satellite communication system discussed herein.
Figure 4:
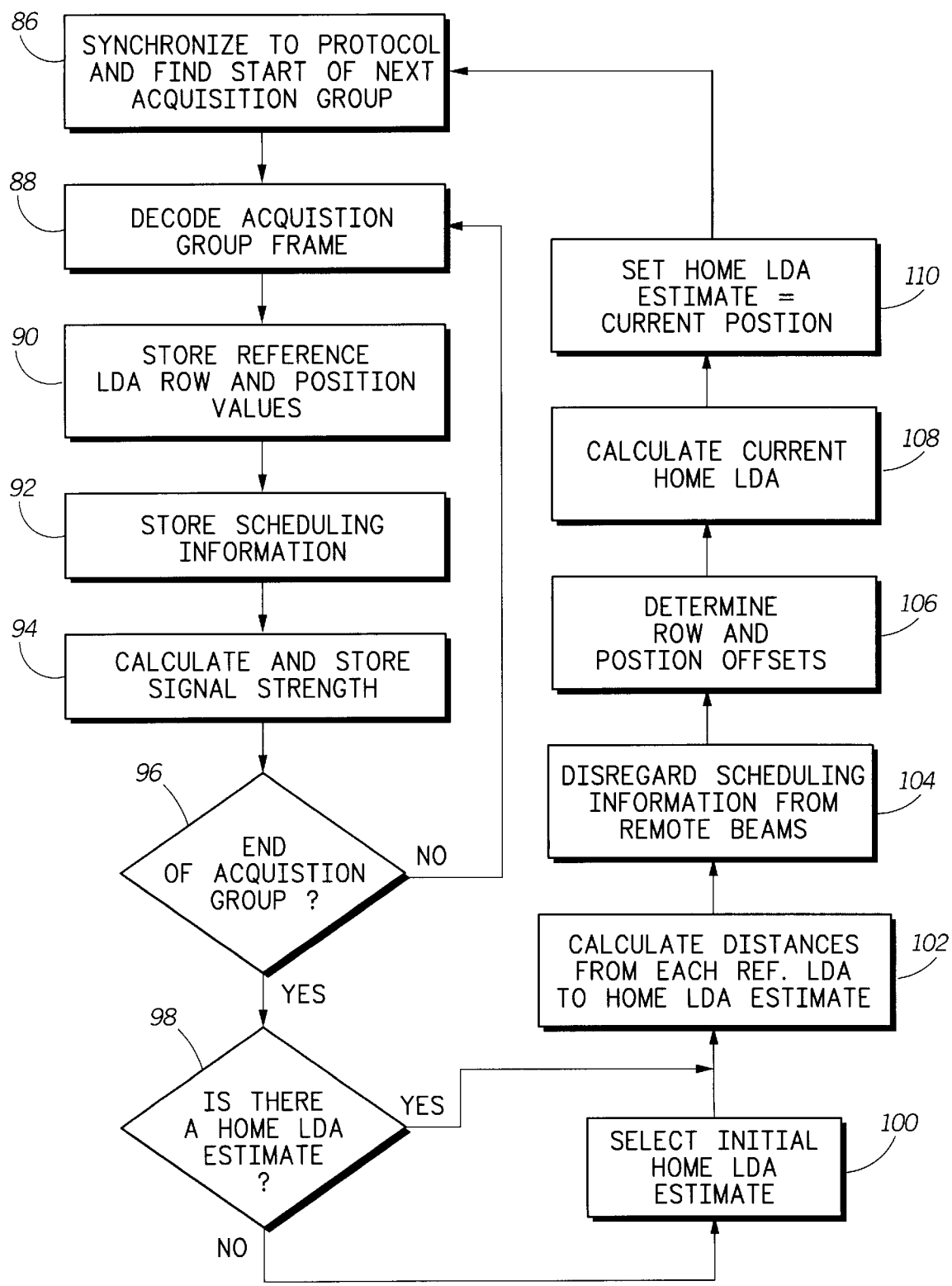
FIG. 4 is a flow chart showing how the processor of FIG. 3 is programmed to cause the SCR to operate in accordance with the invention.

Referring to FIG. 4, the SCR 53 first synchronizes to the signaling protocol conventionally, and finds the start of the next Acquisition Group (step 86), such as the Acquisition Group which forms part of block 42 in FIG. 2. The SCR proceeds (step 88) to decode the first frame of the Acquisition Group. In addition to the other information contained in the Acquisition Group, it also carries the information that identifies the position of the reference LDA of the received beam and, per step 90, the SCR stores the row and position values of that reference LDA.

In the next step 92, the SCR stores scheduling information contained in the frame being decoded. The SCR then determines or estimates the strength of the received signal (step 94) using conventional techniques. This can be done by sampling the received signal and converting it into a frequency domain representation using a Fast Fourier Transform. The peak signal strength is averaged over the duration of a data burst (a data burst is 1016 bits of data sent at 50 kilobits per second for a single frame of information representing an SCR's message). This average value is then quantized into an n-bit representation of signal strength for that data burst, and that signal strength value is stored in the SCR's memory 66.

If the SCR has decoded every frame in the Acquisition Group (step 96), it proceeds to step 98; if not, the program loops through steps 88–96, decoding one frame at a time until the entire Acquisition Group has been decoded and the information contained therein stored.

In step 98, the SCR determines whether it has previously stored an estimate of its home LDA, i.e., the LDA where it usually operates, or its last known position if it has moved. If it does not have such an estimate, the program proceeds to step 100 where the SCR selects an initial home LDA estimate. This estimate is preferably the reference LDA of the beam having the strongest signal strength determined per step 94.

Figure 5:
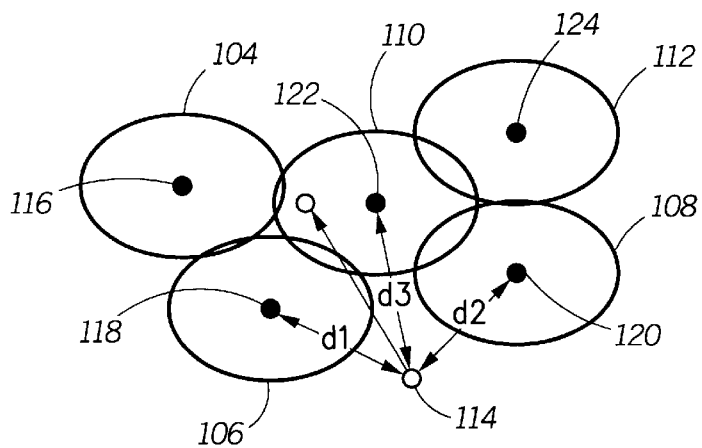
FIG. 5 shows another pattern of beams for illustrating certain distance calculations made by the SCR as it calculates its position according to a preferred embodiment of the invention.

The next step 102 involves calculating the distance between the estimated home LDA and each reference LDA. An example is shown in FIG. 5.

Five beams 104, 106, 108 110 and 112 are received by a SCR positioned at estimated home LDA 114. The beams have reference LDA's 116, 118, 120, 122 and 124. Per step 102, the SCR calculates the distance between estimated home LDA 114 and each of the reference LDA's. Three exemplary distances d1, d2 and d3 are shown, but it should be understood that the SCR also calculates distances to reference LDA's 116 and 124.

The distances between the home LDA 114 and each of the reference LDA's are calculated using the calculations described below.

To calculate the distance between two LDA's, the SCR stores the following information in memory 66:
1) a lookup table containing the row number and position number of each LDA in each of 155 rows. ($RowMod_i$ = the number of positions in row i);
2) East-West separation parameter $D_\theta$ (longitudinal distance between adjacent LDA centers) approximately 150 km;
3. North-South separation parameter $D_\phi$ (latitudinal distance between adjacent LDA centers) approximately 130 km.

Each satellite beam identifies its reference LDA by a number that the SCR translates to a unique row and position value using the lookup table referred to above.

Given the information indicated above, an approximation of the distance in kilometers between two LDA's can be obtained using the following procedure:
1) Let (Row1, Pos1) represent home LDA 114, and (Row2, Pos2) represent the location of reference LDA 118.

2) Calculate the cosines of the angles separating each LDA from the equator. These will be used to approximate the separation in latitude between the two LDAs. (If $-67.5 \leq$ Row Latitude $\leq 67.5$):

$$Cos(\phi_i) = RowMod_i / RowMod_{(NumRows+1)/2} \quad (i = 1, 2);$$

(If 67.5<Row Latitude or Row Latitude<−67.5):

$$Cos(\phi_i) = \frac{\pi}{2(NumRows - 1)} * \{NumRows - 1 - |NumRows + 1 - (2 * Row_i)|\}$$

$$(i = 1, 2);$$

3) Calculate the approximate longitudinal difference (=360 * Δpos) in degrees between the two LDA's, where:

$$\Delta pos = \min\{|(pos_2/RowMod_2) - (pos_1/RowMod_1)|, 1 - (pos_2/RowMod_2) - (pos_1/RowMod_1)|\}$$

4) Calculate the Great Circle Distance (GCD) between the two LDAs:
(If the longitudinal distance <107 degrees):

$$\Delta row = (row_2 - row_1) D_\phi / D_\theta$$

(If either latitude is between −45 and 45 degrees):

$$GCD = D_\theta \sqrt{\Delta row^2 + \Delta pos^2 * \cos(\phi_1) * \cos(\phi_2)}$$

else (If neither latitude is between −45 and 45 degrees):

$$GCD = D_\theta \sqrt{\Delta row^2 + (\Delta pos^2 - \Delta pos^4 / 12) * \cos(\phi_1) * \cos(\phi_2)}$$

(If the longitudinal distance >107 degrees):

$$GCD = D_\theta \sqrt{\Sigma row^2 - (\Delta pos - 1/2)^2 * \cos(\phi_i) * \cos(\phi_2)}$$

where:

$$\Sigma row = (NumRows - 1 - |row_1 + row_2 - NumRows - 1|) * (D_\phi / D_\theta)$$

The GCD gives the approximate distance (in kilometers) of d1, the distance between estimated home LDA 114 and reference LDA 118. The same procedure is used to calculate GCD's between estimated home LDA 114 and each of the reference LDA's.

Having calculated the GCD's, they are used to identify beams which are remote from the SCR so that the scheduling information from such remote beams can be disregarded. A beam is considered remote if the distance between its reference LDA and the SCR's home LDA exceeds a predetermined distance, such as 450 km, for example. Thus, if the predetermined distance is 450 km, the previously stored scheduling information obtained from a beam whose reference LDA is 450 km or more from the home LDA will be disregarded. See step 104. Because the disregarded scheduling information was likely not intended for the SCR, power is saved by not looking for messages associated with the disregarded scheduling.

In the next step 106, the SCR determines row and position offsets that are essentially components of a vector that points to the SCR's new position. These offsets are calculated using the ΔRow and ΔPos values obtained from the GCD calculations above, along with the signal strength estimates associated with each reference LDA.

The calculations used in step 106 are as follows:

1) For the set of 'n' beams, calculate the row and position offsets or adjustments required to form the current home LDA estimate. These offsets are weighted by the signal strengths that were measured previously.

RowAdjust=Σ$w_i$*Δ$row_i$

PosAdjust=Σ$w_i$*Δ$pos_i$ where $w_i$ is the signal strength estimate for reference LDA i, and Δ$row_i$ and Δ$pos_i$ are the Δrow and Δpos values previously calculated for reference LDA i.

2) Scale the adjustments according to the number of beams (samples) received, and divide by the LDA Size to obtain New Pos Adjust and New Row Adjust. That is:

$$NewPosAdjust = \left(\frac{1}{n} * \frac{PosAdjust}{D_\theta}\right)$$

$$NewRowAdjust = \left(\frac{1}{n} * \frac{RowAdjust}{D_\phi}\right)$$

and round the result to the nearest integer value.

The next step 108 involves calculating the SCR's current home LDA, i.e., the LDA where the SCR is currently located. A vector is formed extending from the previous estimated home LDA to the current LDA. This is done by adding the row and position adjustments from 2) above to the row and position values of the previous estimated LDA.

Current HomeLDARow=Previously Estimated Home LDA Row+ New Row Adjust

Current HomeLDAPos=Previously Estimated Home LDA Pos+ New Pos Adjust

The row and position values for the current home LDA identify the current estimated position of the SCR. In the next step 110, the home LDA estimate is set to the values just calculated for the current home LDA. Thus, the current estimated position is used in steps 98, 102 in the next pass through the program. As each additional frame is decoded, the estimate of the current home LDA moves closer to the SCR's actual position.

It will be appreciated that an SCR that can identify its position as described above, and ignore scheduling information carried by remote beams, will use less energy and extend the life of its battery.

Although the invention has been described in terms of a preferred embodiment, it will be obvious to those skilled in the art that various alterations and variations may be made without departing from the invention. Accordingly, it is intended that all such alterations and variations be considered as within the spirit and scope of the invention as defined by the appended claims.

What is claimed is:

1. In a communication system in which orbiting satellites illuminate portions of the earth with beams of RF energy, each beam containing signals encoded with information identifying a reference delivery area to be illuminated by the beam, a method for a selective call receiver which stores values identifying a previous estimated position to determine its current position, comprising:

a) decoding signals received from multiple beams, including information identifying reference delivery areas;

b) measuring signal strength of each of a plurality of the signals decoded in step a); and c) calculating an estimated position of the selective call receiver using reference delivery areas identified in step a) and the signal strengths measured in step b) wherein the step of calculating includes the step of calculating offsets between the previous estimated position and locations of the reference delivery areas and the step of adding the offsets to the values indentifying the last estimated position to calculate a current estimated position.

2. A method as set forth in claim 1 wherein the signals transmitted by each beam include scheduling information, and wherein the selective call receiver is able to conserve power by the additional steps of:

d) determining which beams are relatively remote from the estimated position calculated in step c); and e) disregarding scheduling information transmitted by the relatively remote beams.

3. A method as set forth in claim 2 wherein step d) includes determining a great circle distance between the estimated position of the selective call receiver and each reference delivery area, and wherein a beam is considered relatively remote if the great circle distance between the beam's reference delivery area the selective call receiver's estimated position exceeds a predetermined distance.

4. A method as set forth in claim 1 wherein the offsets are weighted by the signal strengths measured is step b).

5. In a communication system in which orbiting satellites illuminate portions of the earth with beams of RF energy, each beam containing signals encoded with scheduling information and information identifying a reference delivery area to be illuminated by the beam, a method for a selective call receiver which stores values identifying a previous estimated position to disregard signals from beams that are relatively remote from the selective call receiver's current position, comprising:

a) decoding signals received from multiple beams, including information identifying reference delivery areas;

b) determining the distance between a current estimated position of the selective call receiver and the reference delivery areas by calculating offsets between the previous estimated position and locations of the reference delivery areas and by adding the offsets to the values identifying the previous estimated position to calculate the current estimated position; and c) disregarding scheduling information of beams whose reference delivery areas are at least a predetermined distance beyond the estimated position of the selective call receiver.

6. A method as set forth in claim 5 including utilizing scheduling information of beams whose reference delivery areas are within the predetermined distance of the estimated position of the selective call receiver.

7. A method as set forth in claim 5 including measuring signal strength of each of a plurality of the signals decoded in step a), and weighting the offsets by the signal strengths.

* * * * *